United States Patent
Mears et al.

(10) Patent No.: US 6,704,061 B2
(45) Date of Patent: Mar. 9, 2004

(54) TEMPORARY SIMULATED OFF STATE IN A RESTART OF A VIDEO DISPLAY

(75) Inventors: Mark Gilmore Mears, Zionsville, IN (US); Scott Joseph Duggan, Indianapolis, IN (US); Thomas Edward Gospel, Carmel, IN (US); Gene Harlow Johnson, Carmel, IN (US)

(73) Assignee: Rhomson Licensing S.A., Boulogne (FR)

(*) Notice: Subject to any disclaimer, the term of this patent is extended or adjusted under 35 U.S.C. 154(b) by 435 days.

(21) Appl. No.: 09/891,770

(22) Filed: Jun. 26, 2001

(65) Prior Publication Data

US 2002/0085127 A1 Jul. 4, 2002

Related U.S. Application Data

(60) Provisional application No. 60/259,714, filed on Jan. 4, 2001.

(51) Int. Cl.[7] .............................. H04N 5/63; G09G 3/36
(52) U.S. Cl. ...................... 348/730; 348/739; 345/102; 315/169.3
(58) Field of Search ................................. 348/730, 739, 348/744, 790, 800; 345/102; 349/61, 70; 315/169.3, 157, 158

(56) References Cited

U.S. PATENT DOCUMENTS

| | | | | |
|---|---|---|---|---|
| 4,980,836 A | * | 12/1990 | Carter et al. ................ | 713/322 |
| 5,274,611 A | * | 12/1993 | Donohoe ..................... | 368/10 |
| 5,548,832 A | | 8/1996 | Karam | |
| 5,822,587 A | * | 10/1998 | McDonald et al. ......... | 717/108 |
| 6,081,902 A | * | 6/2000 | Cho ............................. | 713/330 |
| 6,388,388 B1 | * | 5/2002 | Weindorf et al. ........ | 315/169.3 |

FOREIGN PATENT DOCUMENTS

| | | |
|---|---|---|
| JP | 8-246674 | 9/1996 |
| JP | 9-46645 | 2/1997 |
| JP | 10-90647 | 4/1998 |
| JP | 10-241872 | 9/1998 |

* cited by examiner

*Primary Examiner*—Michael H. Lee
(74) *Attorney, Agent, or Firm*—Joseph S. Tripoli; Joseph J. Laks; Harvey D. Fried

(57) ABSTRACT

A liquid crystal display television receiver projection system uses a high-intensity discharge lamp as a back lighting source. The lamp is of the type that should not be re-started or turned on immediately after being turned off. In response to a user power off command, the display screen will immediately give a false appearance of being turned off, during a first interval of, for example, 30 seconds that immediately follows the power off command. Despite the appearance of being turned off, the lamp is maintained powered on, during the first interval. Should a user issue a power on command, before the first interval has elapsed, the user will not experience any start-up delay. Should the user not issue et power on command, during the first interval, the lamp will be de-energized.

9 Claims, 3 Drawing Sheets

TEMPORARY SIMULATED OFF STATE IN A RESTART OF A VIDEO DISPLAY

CROSS REFERENCE TO RELATED APPLICATIONS

This application claims priority of U.S. provisional patent application No. 60/259,714 filed Jan. 4, 2001.

BACKGROUND

This invention relates to a power on/power off control arrangement of a video display.

A liquid crystal display (LCD) or and a liquid crystal on silicon (LCOS) television (TV) receiver projection system often uses a high-intensity discharge lamp, or bulb, as a back lighting source. High intensity discharge lamps operate with mercury vapor. It is known that preventing the mercury vapor from de-energizing before re-striking the vapor (i.e., turning power to the lamp back on immediately after or shortly after turning the power off) may shorten the bulb life. Because re-energizing a partially energized bulb should be avoided, some projection systems introduce a restart delay. The user is prevented from turning the TV receiver back on until the bulb is fully de-energized that occurs, for example, after approximately 30 seconds. This approach is particularly annoying to the user because the user is not able to turn the TV receiver back on immediately, as is possible in a TV receiver that does not use a high-intensity discharge lamp. Instead, the user must endure a start-up delay. The start-up delay includes approximately 30 seconds for the bulb to cool down and approximately another 30 seconds for the bulb to reheat.

In response to a user's command requesting system turn off, the InFocus model LP755 Front Projector, for example, made by Infocus Corporation, will display a message asking "Do you really want to turn off the system?". This approach gives the user the opportunity to re-consider before shutting down, but does not solve the problem directly. Also, this approach is awkward because at least about 90% of all power-off commands are intentional. It may be desirable to eliminate the restart delay, when the user tries to turn on the receiver immediately after turning it off.

In response to a user power off command, a TV receiver, embodying an inventive feature, will immediately give a false appearance of being turned off. In spite of the turn off appearance, the bulb is maintained powered on or energized, during a first interval of, for example, 30 seconds that immediately follows the power off command.

Should the user issue a power on command, before the first interval has elapsed, the user will not experience any start-up delay. The first interval should be, advantageously, more than long enough to accommodate an inadvertent or unintended power off command. Thus, the user would experience a start-up delay, only when the user issues a power on command, after the first interval has elapsed.

It may be desirable to create in the user, during the first interval, a sufficiently convincing false impression of a powered-off TV receiver that, in other words, will fool the user. One might very well expect that different users will respond to different visual and audio cues when assessing whether or not a power off command has indeed turned off a television receiver, even if the user is not particularly cognizant of such an analysis. The absence of a picture, the absence of sound and the absence of light from the power on indicator can each work alone and/or in combination to fool different users at different times.

In accordance with the inventive arrangements, the TV receiver will appear to be "somewhat" convincingly off, during the first interval. The term "somewhat" is used because the lighted lamp can not be masked completely. The lamp is generally disposed at the rear of the cabinet and is well shielded to prevent accidental eye damage. However, the lamp is ventilated and cooled and some light will inevitably escape from the cabinet and be perceptible to some extent, especially if the ambient light is dim. Moreover, a cooling fan may continue to operate and noise from the fan might be perceptible as well. Nevertheless, for purposes of creating an illusion for the short period of time in which the TV receiver is likely to be switched back on after being unintentionally turned off, the illusion is sufficiently convincing. It should be remembered, after all, that a magician's audience is still thrilled by the magician's tricks even though the audience is well aware that the tricks are illusions.

SUMMARY OF THE INVENTION

A video display apparatus, embodying an inventive feature, includes a back lighting lamp that is energized, during a normal video display mode of operation, to produce an image. A source of an input, power-on-control signal is provided. A source of an input, power-off control signal is provided. A first timer is responsive to the power-off control signal and coupled to the lamp for maintaining the lamp energized, during a first interval, that follows the occurrence of the power-off control signal. The lamp is de-energized following an end of the first interval. If the power-on control signal occurs, during the first interval, the lamp is prevented from being de-energized, following the end of the first interval, and the normal video display mode operation resumes.

DETAILED DESCRIPTION

Figure 1:
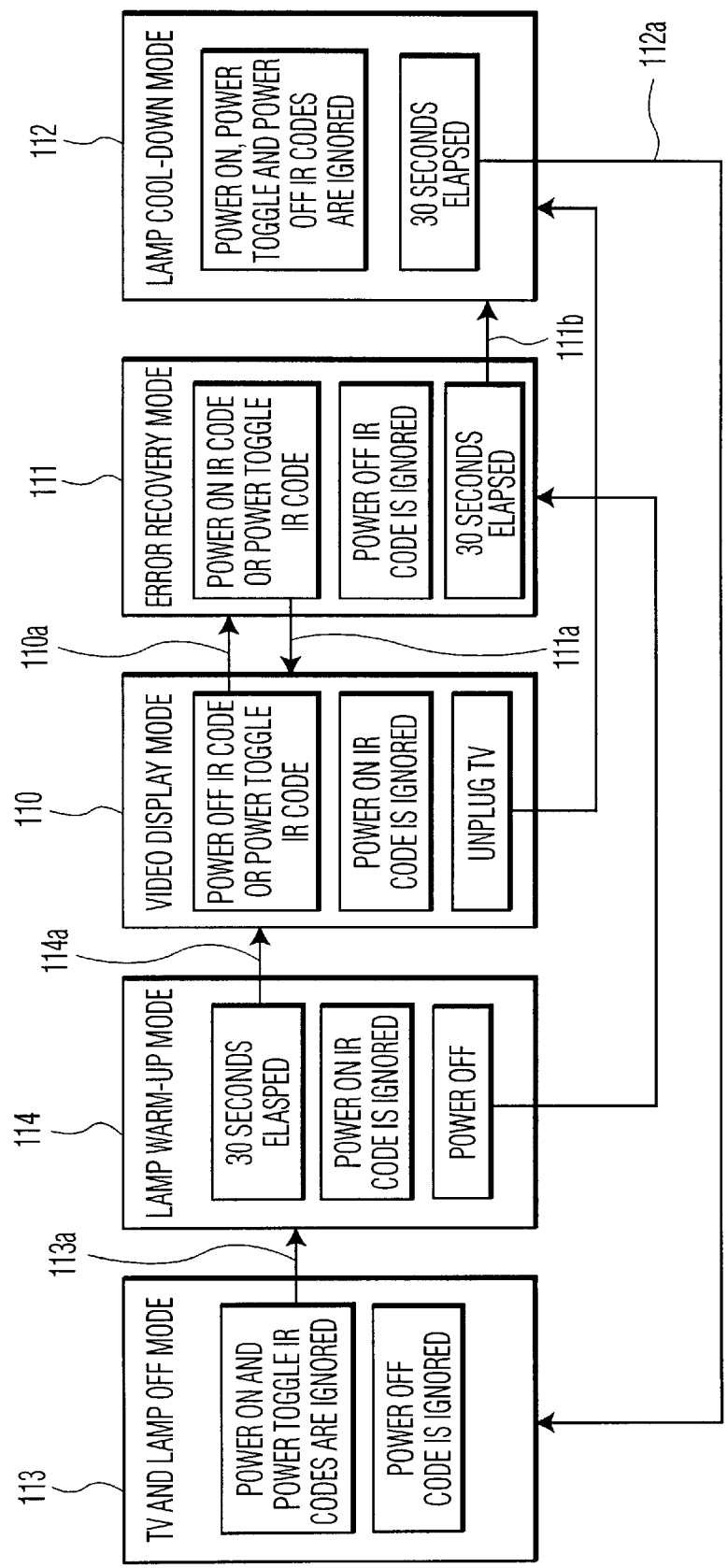
FIG. 1 illustrates a general flow chart for the modes of operation of a projection television of FIG. 3, embodying an inventive feature.
Figure 2:
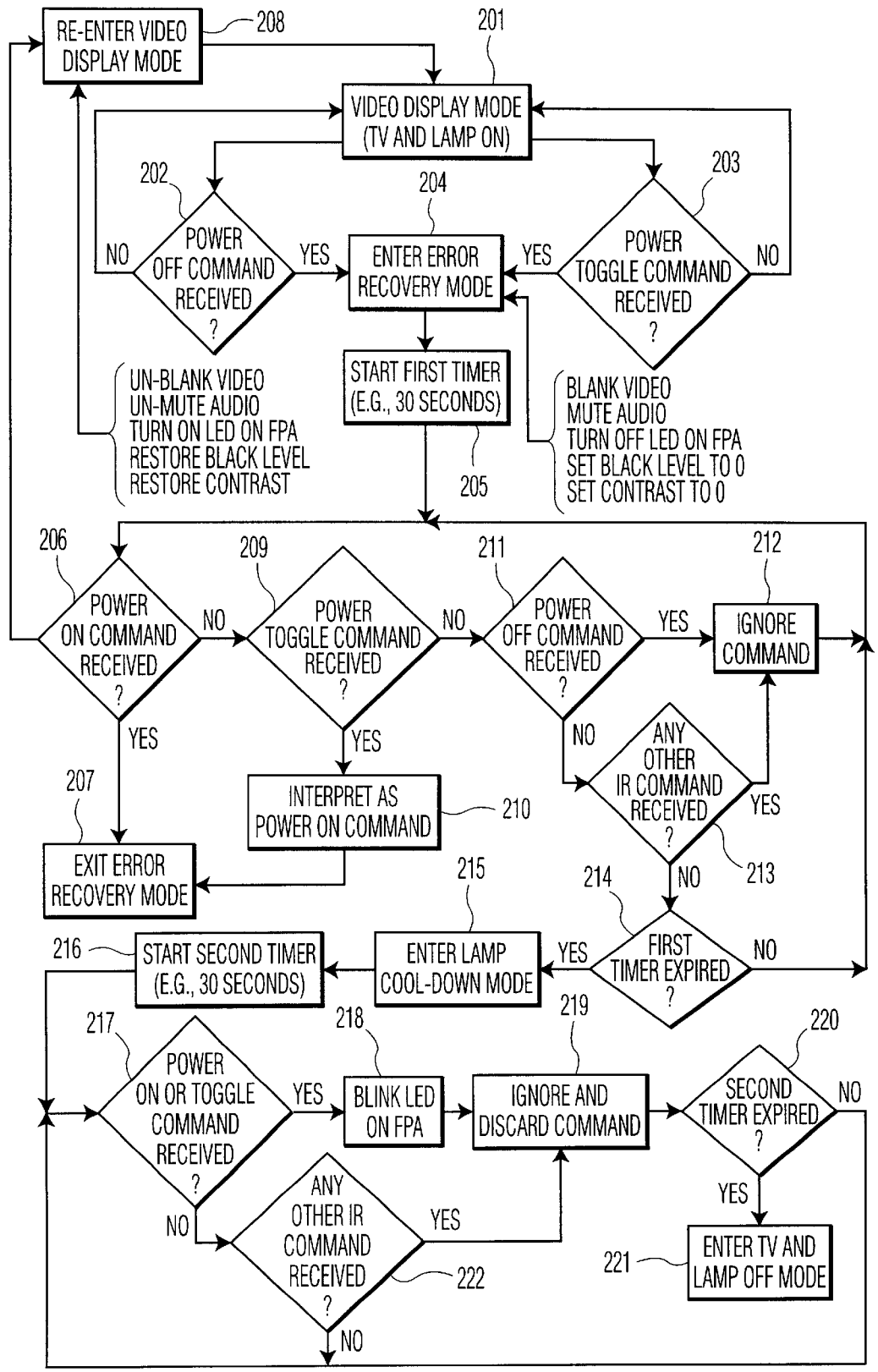
FIG. 2 illustrates more detailed flow chart for describing the operation of the projection television of FIG. 3.
Figure 3:
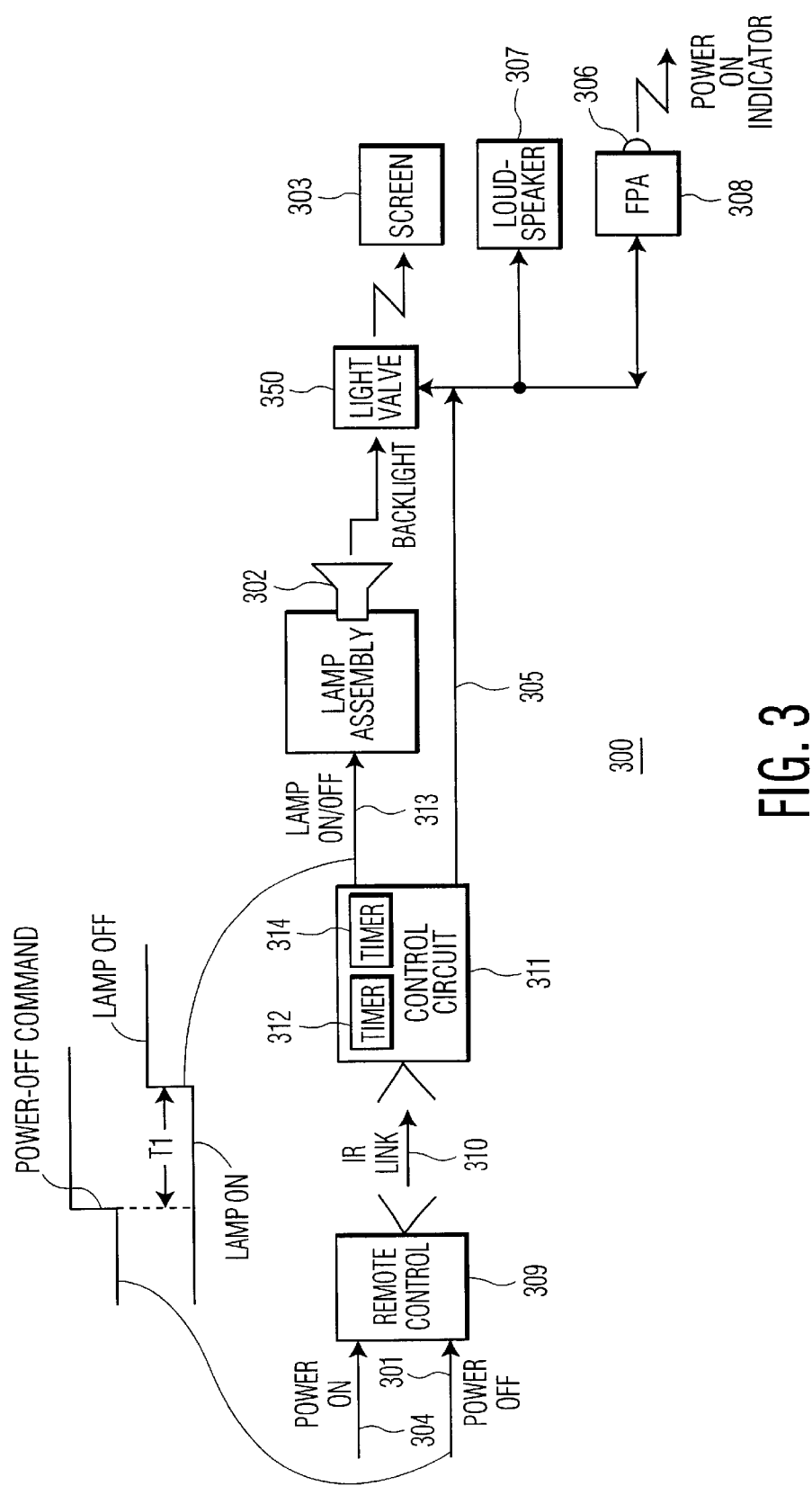
FIG. 3 illustrates, in a block diagram form, a projection television, embodying an inventive feature.

FIG. 1 illustrates a flow chart for explaining modes of operation of a liquid crystal display (LCD) or a liquid crystal on silicon (LCOS) projection television (TV) receiver 300 of FIG. 3, embodying an inventive feature. TV receiver 300 utilizes a high-intensity discharge lamp 302 forming a back light source for a light valve 350. FIG. 2 illustrates in a detailed flow chart of operation of TV receiver 300 of FIG. 3. Similar symbols and numerals in FIGS. 1–3 indicate similar items or functions.

Many high definition television (HDTV) receivers respond to both the "TV" Infra Red (IR) preamble code (0) and to the "satellite/SAT1" IR preamble code (8). Accordingly, the preamble is not important to the following discussion and will be omitted. In the following discussion, it will be helpful to note that "C5" is the discrete "POWER ON" IR code, "C4" is the discrete "POWER OFF" IR code, and "D5" is the discrete "POWER TOGGLE" IR code. These hexadecimal codes can vary from one manufacturer to the next, and accordingly, are not included in the Figures. It can also be noted that most receivers and remote control systems are designed to operate with power-on and power-off commands or with power-toggle commands, but not both. Most systems manufactured by Thomson multimedia, for example, are responsive to all three commands, and this is reflected in the flow chart of FIG. 2 and in the following discussion.

Assume that TV receiver 300 of FIG. 3 operates in a normal Video Display mode, referred to in a block 110 of FIG. 1. A user issuing a power off command via, for example, a control signal 301 and an IR link 310 of FIG. 3 causes TV receiver 300 to enter an Error Recovery mode, referred to in a block 111 of FIG. 1, via a flow chart path 110a. If the power off command was issued inadvertently, the user can recover from the error by issuing, within, for example, a 30 second interval, a power on command, as depicted by a flow chart path 111a, via a control signal 304 of FIG. 3 to turn TV receiver 300 back on. In this case, no turn on delay will occur. Thus, a display screen 303 of TV receiver 300 would have an appearance that is, advantageously, consistent with users' expectations of today's conventional direct-view tube or rear projection TV receivers.

Without the operation in the Error Recovery mode, referred to in block 111 of FIG. 1, the user would need, disadvantageously, to wait approximately 30 seconds for allowing lamp 302 of FIG. 3 to fully de-energize before turning TV receiver 300 back on. In addition, another period of time would be needed to re-light or re-energize lamp 302.

The Error Recovery mode, referred to in block 111 of FIG. 1, occurs, during an interval T1 of FIG. 3. During interval T1, display screen 303 of TV receiver 300 has a false appearance as though TV receiver 300 is turned off. This is accomplished even though lamp 302 remains on and fully energized. A user can generate the power-on command or power toggle command via control signal 304 before the aforementioned interval T1 expires or elapses (for example 30 seconds), and TV receiver 300 will appear to be quickly turned back on. The user never need know that TV receiver 300 was, in fact, never fully turned off. On the other hand, if the user does not generate the power-on command via control signal 304 before the aforementioned interval T1 expires, the mode changes, via a flow chart path 111b of FIG. 1, to a 30-second Lamp Cool-Down mode, referred to as block 112 of FIG. 1.

If the user tries to power on TV receiver 300, during the 30-second Lamp Cool-Down mode, referred to as block 112 of FIG. 1, a light emitting diode (LED) 306 of FIG. 3 will blink. The blinking of LED 306 will let the user know that the command was received but the command will not be processed. Consumers have been trained for decades to believe the information represented by power-on indicators in all sorts of appliances.

Assume that TV receiver 300 of FIG. 3 operates in the normal Video Display mode, referred to as block 110 of FIG. 1, that is, the user is watching a TV program. The normal Video Display mode is referred to as step 201 of FIG. 2. The user presses an ON-OFF button on a remote control, not shown, once, which sends a POWER TOGGLE (D5) command, referred to in step 202 of FIG. 2 from remote control unit 309 to TV receiver 300 of FIG. 3. Alternatively, the user presses the ON-OFF button, not shown, twice within a 2-second window (a so-called "DOUBLE OFF" feature of an RCA CRK76 model remote). Not only is POWER TOGGLE (D5) command, referred to in step 203 of FIG. 2, sent by remote control unit 309 to TV receiver 300 of FIG. 3, but a stream of commands are sent by remote control unit 309. The last of the stream of commands are three consecutive TV POWER OFF (C4) commands.

Consequently, TV receiver 300 of FIG. 3 enters the Error Recovery mode, referred to in step 204 of FIG. 2. In this mode, steps are undertaken to create an illusion that TV receiver 300 of FIG. 3 has been turned off, even though lamp 302 is still lit. During the Error Recovery mode, referred to in block 111 of FIG. 1, the Contrast and Brightness (Black Level) of display screen 303 of FIG. 3 are minimized by the operation of a control circuit 311 (for example, set to zero) via a control path 305. Control circuit 311 may include a microprocessor, not shown. Also, the video is blanked, for example, by turning off one or more display processors, not shown, via control path 305. Additionally, the audio in a speaker 307 is muted and power-on indicator LED 306 placed on a front panel assembly (FPA) 308 is turned off. It was found, for example, that merely displaying a completely black picture might not be sufficient to convey a convincing appearance of TV receiver 300 being turned off.

TV receiver 300 can continue to acknowledge the receipt of all commands, for example by flashing on LED 306 whenever a remote control command produced by a remote control unit 309 is received from the user, even if the command will be ignored during the Lamp Cool-down mode. These steps together give a reasonably convincing appearance to the user that TV receiver 300 is off. Thus, control circuit 311 turns off everything except lamp 302.

A first time-out timer 312 of control circuit 311 is started, referred to in step 205 of FIG. 2. Timer 312 has a time-out duration that can correspond to the time needed for lamp 302 to be fully de-energized. In many cases, this requires about 30 seconds. It should be understood that for first time-out timer 312, the time-out duration need not be linked to the time required for lamp cool-down, although this is a convenient reference.

If a POWER ON (C5) command is received via IR link 310 of FIG. 3 before the end of the Error Recovery mode, as depicted in step 206 of FIG. 2, receiver 300 of FIG. 3 exits the Error Recovery mode, as depicted in step 207 of FIG. 2. Thereafter, receiver 300 of FIG. 3 re-enters the Video Display mode, as depicted in step 208 of FIG. 2. In the Video Display mode, the video is unblanked, the audio is unmuted, the power-on indicator is turned on, the black level is restored and the contrast setting is restored.

A similar situation occurs if, in a step 209 of FIG. 2, a POWER TOGGLE (D5) command is received via IR link 310 of FIG. 3 (that is, the ON-OFF button, not shown, is pressed on the remote or the front panel) before the end of the Error Recovery mode. As depicted in step 210 of FIG. 2, the POWER TOGGLE command is interpreted as a POWER ON command and receiver 300 of FIG. 3 re-enters the Video Display mode of step 201, as described before.

If a POWER OFF (C4) command is received before the end of Error Recovery mode, as depicted in step 211 of FIG. 2, that command is ignored, as depicted in step 212. For all practical purposes, to the perception of the user, TV receiver 300 of FIG. 3 is already turned off. Therefore instructing TV receiver 300, that is already supposed to be turned off, to turn off again is not logical. Also, if any other IR command (for example, VOLUME, CHANNEL, device key, etc.) is received during Error Recovery mode, the command is ignored because TV receiver 300 is already suppose to be turned off, as depicted in step 213 of FIG. 2.

When the time-out duration of the first time-out timer 312 of FIG. 3 has expired, as depicted in step 214 of FIG. 2, control circuit 311 of FIG. 3 turns off lamp 302 by the operation of an on/off signal 313. Then, control circuit 311 enters Lamp Cool-Down mode, shown in block 112 of FIG. 1, via path 111b of FIG. 1 and also in step 215 of FIG. 2. A second time-out timer 314 of FIG. 3 is started, as depicted in step 216 of FIG. 2. Time-out timer 314 of FIG. 3 has a time-out duration at least as long as the actually required cool-down time of lamp 302, for example 30 seconds.

As depicted in steps 217 and 222 of FIG. 2, if any command is received from remote control unit 309 of FIG. 3 or front panel 308, during the Lamp Cool-Down mode, referred to in block 112 of FIG. 1, these commands are ignored and discarded. Commands that are ignored or discarded are not saved for later execution. As depicted in step 219 of FIG. 2, and TV receiver 300 of FIG. 3 remains in the Lamp Cool-Down mode.

When POWER ON (C5), POWER OFF (C4) or POWER TOGGLE (D5) commands are received in TV receiver 300, they, additionally, cause power-on LED 306 on FPA 308 to blink, as depicted in step 218 of FIG. 2. The blinking informs the user that remote control unit 309 of FIG. 3 is operating properly, and TV receiver 300 is also operating properly; however, TV receiver 300 simply cannot initiate the requested action at the moment.

When second time-out timer 314 expires, as depicted in step 220 of FIG. 2, power to lamp 302 of FIG. 3 is removed by the operation of signal 313, and TV receiver 300 enters TV and Lamp off mode, via a path 112a of FIG. 1. The state, TV and Lamp off mode, is referred to in block 113 and in step 221 of FIG. 2. TV receiver 300 of FIG. 3 is, in fact, completely turned off in this mode (except for power load needed for several auxiliary functions such as, for example, remote control unit 309.

When a power on command or power toggle command is received via, for example, signal 304, TV receiver 300 enters, via a path 113a of FIG. 1, a Lamp Warm-Up mode, referred to in block 114. In the Lamp Warm-Up mode, the picture is first visible at approximately 10 seconds and slowly becomes increasingly brighter. When a 30 second time-out expires, as shown in block 114, TV receiver 300 of FIG. 3 enters Video Display mode, via a path 114a of FIG. 1.

The duration of the Error Recovery mode, referred to in block 111 of FIG. 1, is arbitrarily set at 30 seconds since this is believed to provide the user with enough time to correct an inadvertent power-off situation (e.g., discipline child, stop sitting on remote, or find remote and press power on or power toggle command, etc.). The duration of the Lamp Cool-Down mode, referred to in block 112 of FIG. 1, is estimated to be about 30 seconds. Should a better estimate be found through investigation of how long lamp 302 of FIG. 3 needs before all the mercury loses its "energy", then that duration is to be used as the duration during which the user cannot turn TV receiver 300 back on.

There is no reliable way to distinguish between an "inadvertent off" and an "intentional off". Therefore, to err on the side of safety, it will always be assumed that an OFF (power toggle or discrete power off) is inadvertent because the consequences of not treating it as inadvertent (i.e., inability to immediately turn the TV back on) are more severe than treating it as inadvertent. According to the user's perception, the TV will appear to be "off" in the Error Recovery mode. Unavoidably, the issue persists of the person wanting to turn on the TV during the necessary Lamp Cool-Down mode. However, the probability of wanting to turn on the TV is assumed to be greater in the first 30 second interval, after the occurrence of POWER OFF command, than in the next 30 second interval that follows the first 30 second interval.

What is claimed is:

1. A video display apparatus, comprising:
    a back lighting lamp that is energized, during a normal video display mode of operation, to produce an image;
    a source of an input, power-on control signal;
    a source of an input, power-off control signal;
    a first timer responsive to said power-off control signal and coupled to said lamp for maintaining said lamp energized, during a first interval, that follows the occurrence of said power-off control signal, and for de-energizing said lamp, following an end of said first interval, except that if said power-on control signal occurs, during said first interval, said lamp is prevented from being de-energized, following the end of said first interval, and said normal video display mode operation resumes; and
    a power-off indicator responsive to said power-off control signal for providing an appearance of a power-off mode of operation, during said first interval.

2. A video display apparatus according to claim 1, wherein said indicator comprises a light valve optically coupled to said lamp and responsive to said input power-off control signal for turning off a light output from said light valve, during said first interval for providing the appearance of a power-off mode of operation, during said first interval.

3. A video display apparatus according to claim 2, wherein said indicator further comprises a light source responsive to said power-off control signal for changing an appearance of said light source, during said first interval.

4. A video display apparatus according to claim 3 wherein said light source comprises a light emitting diode.

5. A video display apparatus according to claim 2, wherein said indicator further comprises an audio transducer responsive to said power-off control signal for turning off a sound output from said audio transducer, during said first interval.

6. A video display apparatus according to claim 1, wherein an occurrence of said power-off control signal is disregarded, following a beginning time of said first interval.

7. A video display apparatus according to claim 1, wherein a timer is responsive to said power-off control signal for preventing said lamp from being energized, during a second interval that follows said first interval.

8. A video display apparatus according to claim 1, wherein said lamp provides back lighting in a liquid crystal display (LCD).

9. A video display apparatus according to claim 1, wherein said lamp provides back lighting in a liquid crystal on silicon (LCOS) display.

* * * * *